Sept. 1, 1931.   T. McNALLY   1,821,269
ATTACHMENT FOR WHEELS
Filed March 16, 1928

INVENTOR
T. McNally
BY Munn & Co.
ATTORNEYS

Patented Sept. 1, 1931

1,821,269

UNITED STATES PATENT OFFICE

THOMAS McNALLY, OF PITTSBURG, KANSAS

ATTACHMENT FOR WHEELS

Application filed March 16, 1928. Serial No. 262,146.

My invention relates to improvements in attachment for wheels, and it consists in the combinations, constructions, and arrangements herein described and claimed.

An object of my invention is to provide an attachment for wheels, especially traction wheels, of self-propelled machinery for converting the individual wheels into a chain track construction.

A further object of my invention is to provide a device of the type described, by means of which the tractive surface is increased and the use of rails or planking is eliminated when used on machinery such as steam shovels, traveling derricks, drag lines, excavating machinery, and the like.

A further object of my invention is to provide a device of the type described which has novel means for cooperating with the wheels of the machinery for holding the chain track in operative position.

A further object of my invention is to provide a device of the type described which is simple in construction, which may be readily attached to the machinery, and which is positive in operation.

Other objects and advantages will appear in the following specification, and the novel features of the invention will be particularly pointed out in the appended claims.

Figure 1:
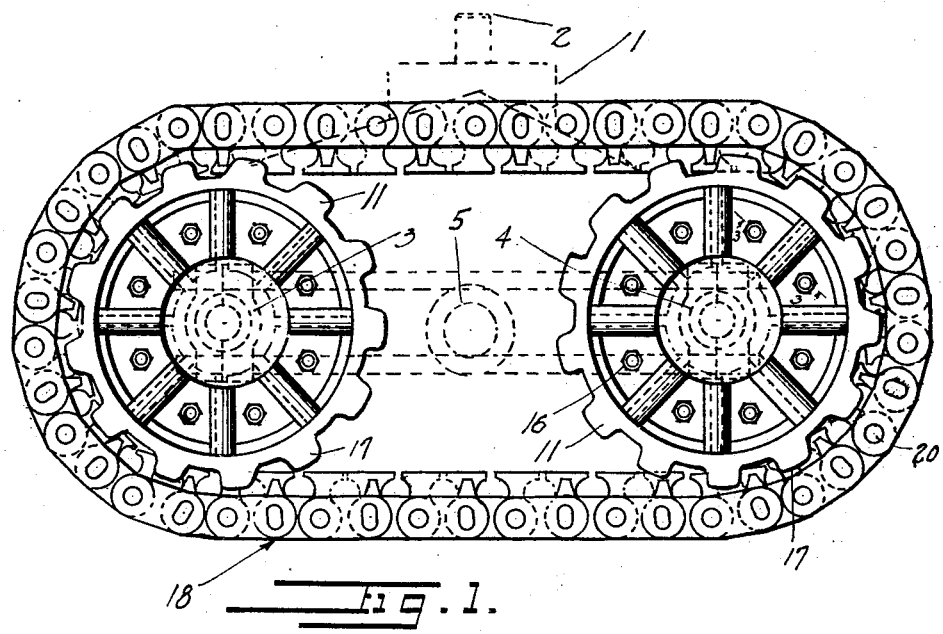
Figure 2:
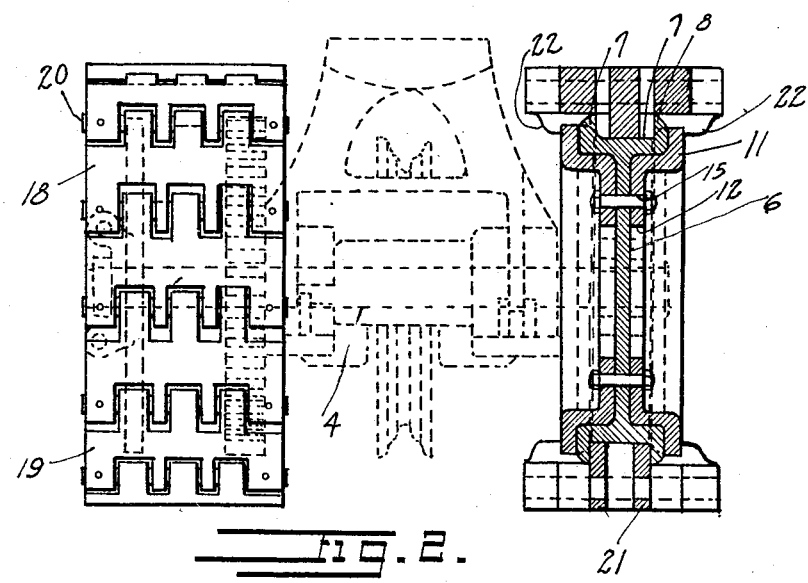
Figure 3:
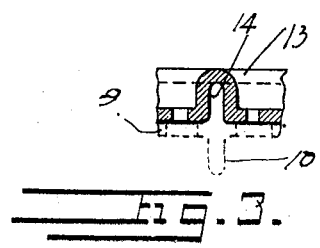

My invention is illustrated in the accompanying drawings, forming part of this application, in which Figure 1 is a side elevation of a truck of a steam shovel embodying my invention, Figure 2 is a rear elevation of a truck embodying my invention, a portion thereof being shown in section, and Figure 3 is a section along the line 3—3 of Figure 1.

In carrying out my invention, I make use of a truck 1 having a pivot point 2 for pivotally supporting any desired mechanism, not shown, such as a steam shovel, traveling derrick, etc. The truck 1 is provided with a pair of shafts which may be termed as a forward shaft 3 and a rear shaft 4, which are operatively connected to a drive shaft 5. The shafts 3 and 4 are provided with wheels 6 which are disposed upon the outer ends of the shafts. The wheels 6 are of the type designed to travel on rails or planking and are thus provided with flange portions 7 which form an annular recess 8 in the periphery thereof. The wheels 6 are provided with a web 9 and transversely extending ribs 10, see Figure 3.

I provide a plurality of sprocket wheels 11 which are identical in construction, and a description of one will apply to them all. The sprocket wheel 11 is provided with a central opening 12 whereby the sprocket wheel may be disposed concentric with either of the shafts 3 or 4. The sprocket wheel 11 is also provided with outwardly projecting portions 13 which provide slots or recesses 14 for receiving the ribs 10 of the wheel. Openings 15 are provided between each of the projections 13 whereby one of the sprocket wheels may be disposed upon each side of the wheel 6 and rigidly secured thereto by passing bolts 16 through the openings 15 and between the ribs 10 of the wheel 6. The bolts 16 rigidly hold the sprocket wheels 11 to the wheel 6 and rigidly hold the ribs 10 in the slots 14.

The sprocket wheels 11 are bent outwardly and upwardly for forming a plurality of sprocket teeth 17. The teeth 17 are disposed adjacent the flanges 7 and extend to a point short of the periphery thereof. Sprocket wheels 11 may in the same manner be secured to all four of the wheels 6.

Traction chains 18 are mounted upon each of the sets of wheels 6 and their respective sprocket wheels. The chains 18 are composed of a plurality of links 19 which are pivotally secured to each other by means of pins 20. The links 19 are each provided with central retaining portions 21 which are receivable in the recesses 8 of the wheels 6 between the flanges 7. Each of the links 19 is provided with teeth 22 at each end thereof, which extend over the flanges 7 and are arranged to engage with the sprocket teeth 17 of the sprocket wheels 11.

From the foregoing description of the various parts of the device, the operation thereof may be readily understood. It is obvious that the machine which embodies my invention may operate in the usual manner by merely removing the chains. This can be accomplished by removing any of the pins 20. During the operation of the machine in the usual manner, the wheels 6 may be propelled upon rails, planking, or the like, without removing the sprocket wheels 11, due to the fact that the sprocket wheels are positioned out of alignment with the periphery of the wheels 6.

Let us assume, however, that the operator wishes to attach the chains and to operate the machine with the chains attached. By placing the chains over the wheels 6 so that the teeth 22 of the chains will be disposed between the sprocket teeth 17, the chains may be secured in place. The chains are held positively against lateral displacement by the retaining portions 21 which are arranged to engage with the inner portions of the flanges 7 and also by the teeth 22 which may engage with the outer portions of the flanges 7.

When power is applied to the shafts 3 and 4 through the drive shaft 5, the wheels 6 are rotated all in the same direction and in unison. Therefore, the chains will be moved in unison and the machine will be propelled thereby. As the wheels 6 are rotated, the teeth 17 of the sprocket wheel engage with the teeth 22, causing an even pull by the forward as well as the rear wheels.

I claim:

1. The combination of a wheel comprising a web having a rim provided with spaced-apart circumferential flanges, and a toothed member mounted on each side of the web and formed for receiving the rim and flanges therebetween whereby the teeth of the toothed members may be positioned in close proximity to the flanges.

2. The combination of a wheel comprising a web having a rim, said web being provided with radially extending flanges on each side thereof, and a toothed member mounted on each side of the web and provided with recesses for receiving the flanges, said toothed members being formed for receiving said rim therebetween whereby the teeth of the toothed members may be positioned in close proximity to the rim.

3. The combination of a wheel comprising a web having a rim, said web being provided with radially extended flanges, said rim being provided with circumferential flanges, and toothed members mounted on each side of the web and formed for providing recesses for receiving the radially extending flanges and for receiving said rim and circumferential flanges therebetween whereby the teeth of the toothed members may be positioned in close proximity to the rim.

4. The combination of a wheel comprising a web having a rim, said web being provided with radially extended flanges, said rim being provided with circumferential flanges, and toothed members mounted on each side of the web and formed for providing recesses for receiving the radially extending flanges and for receiving said rim and circumferential flanges therebetween whereby the teeth of the toothed members may be positioned in close proximity to the rim, the outside diameter of the toothed members being less than the outside diameter of the circumferential flanges.

Signed at Pittsburg in the county of Crawford and state of Kansas this 8th day of March A. D. 1928.

THOMAS McNALLY.